Nov. 21, 1950   F. N. BARD   2,531,021
SWING JOINT
Filed July 22, 1947

Inventor:
Francis N. Bard,
By Smith, Schroeder, Siemans & Hofgren,
Attys.

Patented Nov. 21, 1950

2,531,021

UNITED STATES PATENT OFFICE 2,531,021

SWING JOINT

Francis N. Bard, Highland Park, Ill.

Application July 22, 1947, Serial No. 762,706

1 Claim. (Cl. 285—97.3)

This invention relates to a swing joint, and more particularly to a swing joint of the ball bearing type.

Swing joints normally comprise an outer casing member, an inner member, some kind of bearing means permitting relative rotation between the two, and a packing arrangement for maintaining a fluid-tight seal during such rotation. Such joints have heretofore in many cases used ball bearings to minimize bearing friction, but such prior joints have had certain disadvantages.

A substantial proportion of such joints have in the past been so built that the balls of the bearing assembly had to be put in position and removed from their raceway through a single small opening in the outer casing. This is not only time consuming in any case but renders the disassambly of the joint (as to enable replacement of the packing) particularly troublesome when the oil or grease used as a lubricant gums up, since in such cases it is almost impossible to get the balls out of the hole in the casing. Another disadvantage frequently encountered in previous joints of such a type was that, unless two spaced ball bearing assemblies were used, the joint parts had a tendency to develop "play" or axial wobble during swiveling movement, increasing wear on the packing and reducing its effectiveness.

I have developed and am here disclosing and claiming a joint which obviates these and other disadvantages of former ball bearing swing joints. My improved joint makes use of a split bearing raceway and a holding arrangement therefor such that removal of at least part of the raceway and all of the balls through the end of the joint may be quickly and easily effected. In addition, I provide an annular groove in one of the joint parts so that only one separate raceway arrangement need be used. The arrangement is such that space is provided between the ball bearing assembly and the packing for a lubricant. Moreover, I provide what may be termed a "plain" bearing arrangement on the other side of the packing assembly from the ball bearing to stabilize the joint and insure maintenance of axial alignment between the joint parts in order to minimize wear on the packing.

Figure 1:
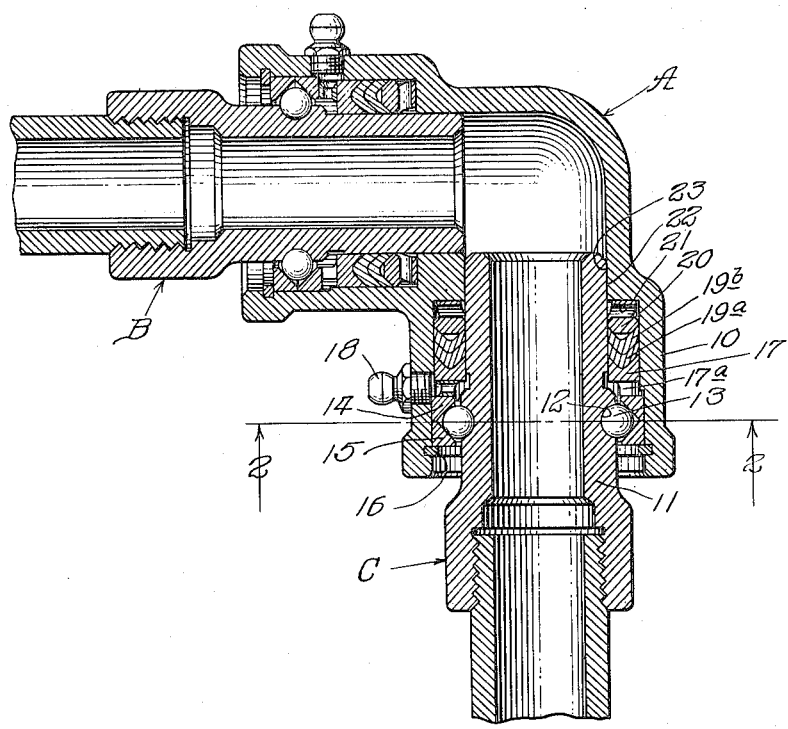
Figure 2:
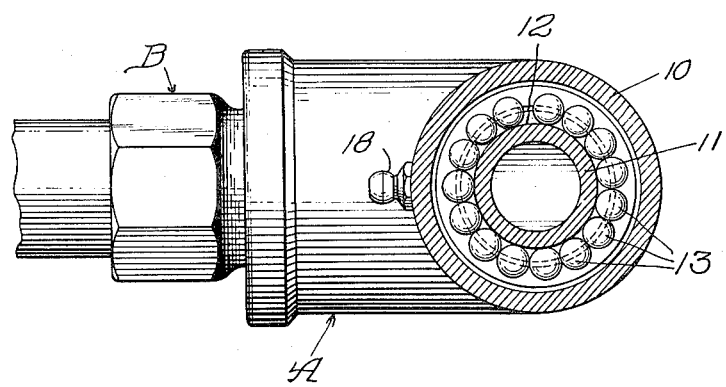

Other features and advantages of this invention will be apparent from the following specification and the drawings, in which:

Figure 1 is a longitudinal sectional view through a double-ended swing joint embodying my invention; and Figure 2 is a transverse sectional view along the line 2—2 of Figure 1.

In the particular embodiment of my invention illustrated in the accompanying drawing, the outer or casing portion of the joint is shown as of the 90° elbow type, with swivel joint arrangements at each end thereof. Since these arrangements are duplicates only one will be described, and it will be understood that my invention may be embodied in a joint having only a single such arrangement, or in alternative joints different from that illustrated.

Referring now more particularly to the drawings, the outer or casing part identified in general as A has two inner or swing members B and C rotatably mounted therein. Limiting the description now to one of the two duplicate arrangements, it will be seen that the casing member has a somewhat expanded end portion 10 adapted to receive not only the inner joint member 11 but also the packing and bearing assemblies, these lying between the two joint parts. The outer surface of the inner member 11 is here shown as provided with an annular groove 12 adapted to receive a plurality of ball bearings 13 and providing one raceway of a ball bearing assembly. The assembly is completed by an outer split raceway comprising the two annular members 14 and 15. The inner surface of the outer casing part 10 is provided with at least an outer portion which is cylindrical and which is adapted to slidably receive these raceway members 14 and 15, so that these members may be readily slid into position or removed from the end of the joint, the outer surfaces of these members being substantially cylindrical and in general correspondence with the casing surface portion in which they are received. The inner surfaces of the raceway members 14 and 15 are oppositely tapered at an appropriate angle, as illustrated, to engage the balls 13. In order to hold the raceway members, and thus the ball bearing assembly, in the joint, the inner casing surface in which the raceway parts are received is provided with a groove near the end in which the snap ring 16 is placed to serve as retaining means.

To the inside of the bearing assembly, on a cylindrical inner surface portion of the casing member 10 which may have the same diameter as that of the outer portion or be of slightly less diameter, as illustrated, is the packing assembly. A packing holding ring 17 is readily slidable in the space between the inner and outer joint members and is provided with integral lug or projecting portions, as the portion 17a adapted to bear against the raceway member 14, to leave space between the members 14 and 17 providing a lubricant chamber to which oil or grease may be admitted through a suitable fitting 18. A pair of annular V-shaped or "chevron" packing members of appropriate packing material, here identified as 19a and 19b, are held against a V-shaped surface of the member 17 by a spreader ring 20 and an annular spring 21 of the wavy or undulating type. The spring, bearing against a shoulder in the casing serves to hold the packing assembly against the raceway member 14 and this in turn against the balls and other raceway and the retaining ring 16, so that the packing and ball bearing both operate properly.

To the inside of the packing assembly is another bearing arrangement of what may be termed the "plain" type, not employing an anti-friction assembly. This comprises a bearing relationship between cylindrical surfaces 22 and 23, the surface 23 of the casing being coaxial with the cylindrical surface portions in which the packing and bearing assemblies are received. This arrangement, with a bearing on each side of the packing assembly, eliminates any axial "wobble" during swiveling action of the joint, resulting in longer life and better sealing characteristics of the packing assembly. On the other hand, since fluid under pressure in the joint tends to separate the joint parts, main bearing strains are taken by engagement of the balls 13 with the outer raceway member 15, of the anti-friction type, so that bearing wear is negligible.

Moreover, as will be readily apparent, the construction and arrangement is such that the joint may be quickly and easily disassembled through the end of the casing member. Removal of the snap ring 16 enables the outer raceway member 15 to be slid out of the end of the joint, whereupon the balls all immediately drop out of the end of the joint, or can be readily picked out even if they are stuck in place with gummed oil. Once the balls are out inner joint part 11, the other raceway member, and the entire packing assembly may all be readily slid out of the casing. Similarly, when the joint is to be reassembled after replacement of the packing, the packing assembly may be dropped in place, the inner raceway moved to the position as illustrated, all of the balls poured in through the end of the joint, and then the assembly locked in operative relationship, by putting the outer raceway member 15 in place and locking it there by snapping the retaining ring 16 in the groove provided therefor.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

A swing joint of the character described, including: an outer casing member; an inner member rotatable in said casing member, said members having spaced confronting surfaces, the surface of one of said members having an annular groove therein; ball bearings in said groove; an annular raceway comprising a part carried by the other member and slidable longitudinally on the said surface thereof to be removable therefrom; and a separate, readily removable retaining member for holding said raceway in the joint part by which it is carried.

FRANCIS N. BARD.

REFERENCES CITED

The following references are of record in the file of this patent:

UNITED STATES PATENTS

| Number | Name | Date |
|---|---|---|
| 1,426,236 | Williams | Aug. 15, 1922 |
| 1,912,494 | Patterson | June 6, 1933 |
| 2,269,431 | Allen et al. | Jan. 13, 1942 |

FOREIGN PATENTS

| Number | Country | Date |
|---|---|---|
| 507,008 | Germany | Sept. 11, 1930 |